(12) United States Patent
Asaura et al.

(10) Patent No.: US 8,534,053 B2
(45) Date of Patent: Sep. 17, 2013

(54) EXHAUST PURIFICATION APPARATUS FOR INTERNAL COMBUSTION ENGINE

(75) Inventors: Shinya Asaura, Mishima (JP); Tomihisa Oda, Numazu (JP); Shunsuke Toshioka, Susono (JP); Masaaki Sato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 341 days.

(21) Appl. No.: 12/675,450

(22) PCT Filed: May 21, 2009

(86) PCT No.: PCT/JP2009/059387
§ 371 (c)(1),
(2), (4) Date: Feb. 6, 2010

(87) PCT Pub. No.: WO2010/134189
PCT Pub. Date: Nov. 25, 2010

(65) Prior Publication Data
US 2011/0056188 A1    Mar. 10, 2011

(51) Int. Cl.
*F01N 3/00*    (2006.01)
(52) U.S. Cl.
USPC .................... 60/295; 60/301; 60/285; 60/287
(58) Field of Classification Search
USPC ............................ 60/277, 276, 286, 295, 301
See application file for complete search history.

(56) References Cited

U.S. PATENT DOCUMENTS

| | | | |
|---|---|---|---|
| 6,455,009 B1 * | 9/2002 | Kato et al. | 422/110 |
| 2003/0140620 A1 * | 7/2003 | Shigapov et al. | 60/286 |
| 2005/0282285 A1 * | 12/2005 | Radhamohan et al. | 436/55 |
| 2006/0086080 A1 | 4/2006 | Katogi et al. | |
| 2006/0130458 A1 * | 6/2006 | Solbrig | 60/286 |
| 2007/0044457 A1 * | 3/2007 | Upadhyay et al. | 60/295 |
| 2007/0137181 A1 * | 6/2007 | Upadhyay et al. | 60/286 |
| 2007/0175208 A1 * | 8/2007 | Bandl-Konrad et al. | 60/286 |
| 2007/0274892 A1 * | 11/2007 | Duvinage et al. | 423/239.2 |
| 2008/0022658 A1 * | 1/2008 | Viola et al. | 60/286 |
| 2010/0050614 A1 * | 3/2010 | Parmentier et al. | 60/287 |
| 2010/0083636 A1 * | 4/2010 | Wang et al. | 60/277 |

FOREIGN PATENT DOCUMENTS

| | | |
|---|---|---|
| JP | A 2003-293743 | 10/2003 |
| JP | A 2006-125247 | 5/2006 |
| JP | A 2006-242094 | 9/2006 |

OTHER PUBLICATIONS

International Search Report issued in corresponding International Application No. PCT/JP2009/059387, mailed Aug. 18, 2009. (with English-language translation).

* cited by examiner

*Primary Examiner* — Thomas Denion
*Assistant Examiner* — Patrick Maines
(74) *Attorney, Agent, or Firm* — Oliff & Berridge, PLC

(57) ABSTRACT

The present invention provides an exhaust purification apparatus for an internal combustion engine which enables a decrease in NOx purification rate and possible ammonia slip to be inhibited. The apparatus includes an NOx catalyst, a urea aqueous solution addition valve serving as reducing agent adding means, and NOx sensors provided an inlet and an outlet of the NOx catalyst, respectively. When the bed temperature of the NOx catalyst is in a predetermined high-temperature region in which the amount of ammonia converted into NOx increases relatively and an NOx purification rate decreases relatively, the apparatus uses outputs from the NOx sensors to perform correction such that the actual addition amount of the urea aqueous solution addition valve reaches a target addition amount.

7 Claims, 6 Drawing Sheets

EXHAUST PURIFICATION APPARATUS FOR INTERNAL COMBUSTION ENGINE

TECHNICAL FIELD

The present invention relates to an exhaust purification apparatus for an internal combustion engine.

BACKGROUND ART

NOx purification systems are known which use a selective catalytic reduction (SCR) method of using ammonia to reduce and remove nitrogen oxide (hereinafter referred to as NOx) in exhaust gas from a diesel engine (see, for example, Patent Document 1). Such an NOx purification system generally supplies ammonia by adding a urea aqueous solution to a denitration catalyst (hereinafter referred to as an "NOx catalyst") via an addition valve to hydrolyze the urea aqueous solution.

If a urea aqueous solution addition system is abnormal, the following problems may occur. An excessive amount of urea aqueous solution may be added to increase the amount of ammonia slipping through the NOx catalyst or an excessively small amount of urea aqueous solution may be added to reduce an NOx purification rate. Examples of abnormality of the urea aqueous solution addition system include crystallization of the urea aqueous solution, blockage of the addition valve by dirt or the like, inappropriate opening and closing of the addition valve, a decrease in the supply pressure of a urea aqueous solution supply pump, and time degradation of the addition system.

Patent Literature 1 discloses the following technique. When a urea aqueous solution is added to an NOx catalyst to purify NOx, a target NOx purification rate is compared with the actual NOx purification rate. If the actual NOx purification rate is lower than the target NOx purification rate, correction is performed to increase the addition amount of urea aqueous solution. If the increase in the addition amount of urea aqueous solution fails to improve the actual NOx purification rate, the system is determined to be abnormal.

CITATION LIST

Patent Literature

PTL 1: Japanese Patent Laid-Open No. 2003-293743

SUMMARY OF THE INVENTION

Technical Problem

To determine whether or not the actual amount of urea aqueous solution added to the NOx catalyst has reached the target addition amount, it is necessary to measure the actual addition amount of urea aqueous solution. When a dedicated sensor is provided for measuring the actual addition amount of urea aqueous solution, manufacturing costs increase. Furthermore, for example, NOx sensors may be provided before and after the NOx catalyst, respectively, so that the actual addition amount of urea aqueous solution can be estimated from a difference in NOx concentration obtained from outputs from the NOx sensors. However, the NOx sensor has the property of reacting both to NOx and to ammonia. Thus, if the NOx sensor detects both NOx and ammonia, it is difficult to accurately estimate the addition amount of urea aqueous solution based on the outputs from the NOx sensors. Hence, precisely controllably correcting the addition amount of urea aqueous solution is difficult.

An object of the present invention is to provide an exhaust purification apparatus for an internal combustion engine which allows the addition amount of reducing agent to be precisely corrected and which prevents possible ammonia slip to be inhibited with a decrease in NOx purification rate suppressed.

Solution to Problem

An exhaust purification apparatus for an internal combustion engine according to the present invention includes an NOx catalyst provided in an exhaust system of the internal combustion engine to selectively reduce NOx, reducing agent adding means provided upstream of NOx catalyst to supply the NOx catalyst with a urea aqueous solution or ammonia as a reducing agent, a first NOx sensor provided upstream of the reducing agent adding means and a second NOx sensor provided at an outlet of the NOx catalyst, each of the NOx sensors reacting both to NOx and to ammonia, and addition amount correcting means for, when a bed temperature of the NOx catalyst is in a predetermined high-temperature region in which the amount of ammonia converted into NOx increases relatively and an NOx purification rate decreases relatively, performing correction using outputs from the first and second NOx sensors so that the actual amount of reducing agent added by the reducing agent adding means follows a target addition amount.

According to this configuration, the NOx purification rate of the NOx catalyst decreases in the predetermined high-temperature region. Hence, the consumption of the added ammonia in connection with NOx purification is reduced, and the conversion of ammonia into NOx is promoted. The resultant NOx flows out from the NOx catalyst. Thus, the second NOx sensor detects an NOx concentration that is higher than that detected by the first NOx sensor, by an amount equal to that of ammonia added. This enables the actual reducing agent addition amount to be more precisely corrected.

The above-described configuration may further has a filter provided upstream of the NOx catalyst to collect a particulate matter contained in exhaust gas. The bed temperature of the NOx catalyst is increased into the predetermined high-temperature region by a recovery process of oxidizing the particulate matter in order to recover a collection capability of the filter.

The above-described configuration may further has heating means for increasing the temperature of the NOx catalyst into the predetermined high-temperature region.

In the above-described configuration, the addition amount correcting means may use the outputs from the first and second NOx sensors to determine the difference between the NOx concentration measured before the NOx catalyst and the NOx concentration measured after the NOx catalyst, and then use the NOx concentration difference to correct the actual amount of reducing agent added by the reducing agent adding means. In this case, the addition amount correcting means may correct the actual addition amount of reducing agent using, in addition to the outputs from the first and second NOx sensors, at least one of a predetermined relationship between a bed temperature of the NOx catalyst and an ammonia slip amount, a predetermined relationship between the bed temperature of the NOx catalyst and a NOx purification rate, and a predetermined relationship between the bed temperature of the NOx catalyst and a rate at which ammonia is converted into NOx.

The above-described configuration may further comprises an oxidation catalyst provided downstream of the NOx catalyst to oxidize ammonia slipping through the NOx catalyst, into NOx. The second NOx sensor may be provided downstream of the oxidation catalyst.

Advantageous Effects of the Invention

The present invention enables a decrease in NOx purification rate and possible ammonia slip to be suppressed.

DESCRIPTION OF EMBODIMENTS

Embodiments of the present invention will be described below with reference to the attached drawings.

Figure 1:
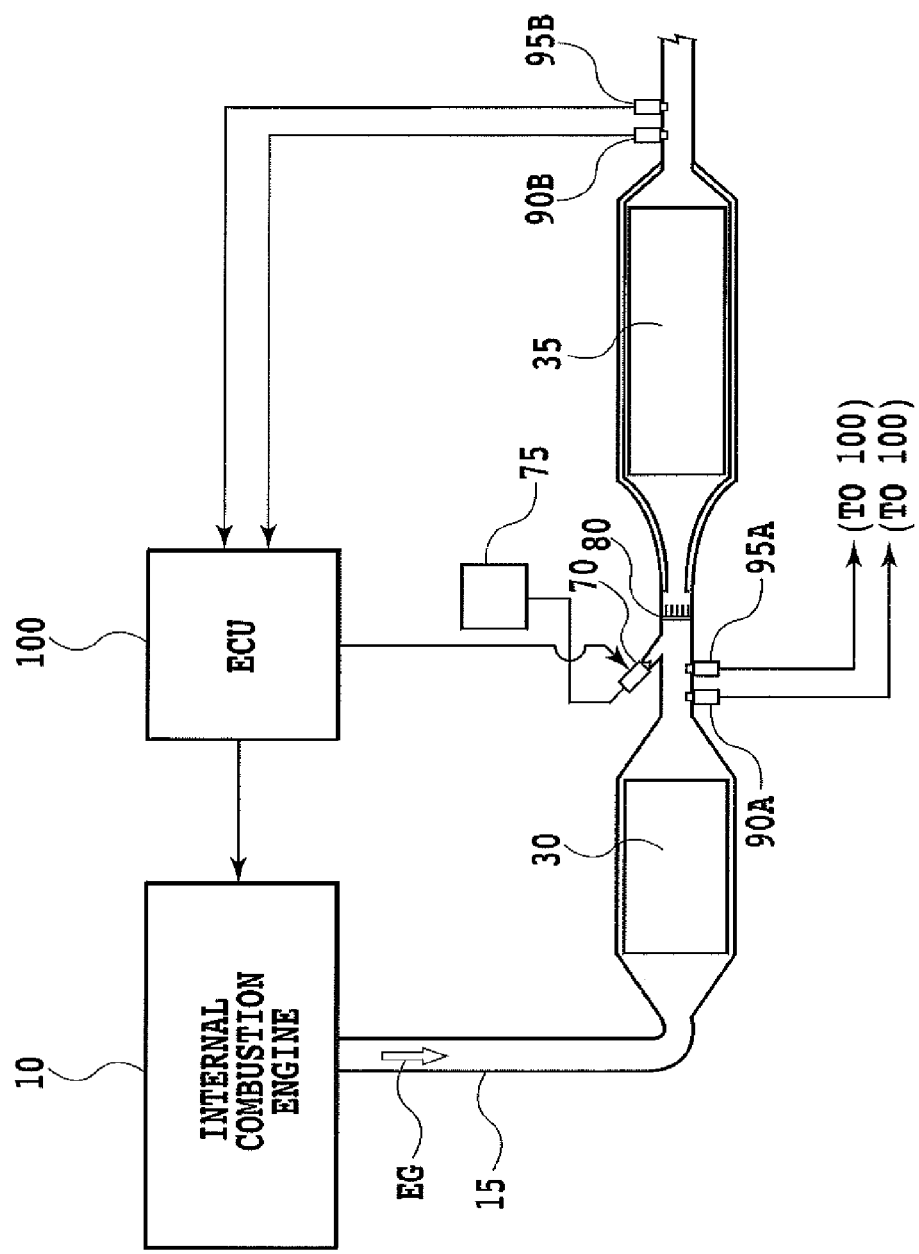
FIG. 1 is a schematic diagram showing the configuration of an exhaust purification apparatus for an internal combustion engine according to an embodiment of the present invention.

FIG. 1 is a diagram showing the configuration of an exhaust purification apparatus for an internal combustion engine according to an embodiment of the present invention.

An internal combustion engine 10 is, for example, a diesel engine. An exhaust passage 15 in the internal combustion engine 10 includes a DPF (Diesel Particulate Filter) 30 serving as a filter, and an NOx catalyst 35.

In the exhaust passage 15, a urea aqueous solution addition valve 70 and an addition valve downstream mixer 80 are provided between the DPF 30 and the NOx catalyst 35; the urea aqueous solution addition valve 70 serves as reducing agent adding means to add a urea aqueous solution to the exhaust passage 15, and the addition valve downstream mixer 80 is provided downstream of the urea aqueous solution addition valve 70 to mix exhaust gas EG with a urea aqueous solution.

Furthermore, in the exhaust passage 15, an NOx sensor 90A and an exhaust temperature sensor 95A are provided upstream of the urea aqueous solution addition valve 70. An NOx sensor 90B and an exhaust temperature sensor 95B are provided downstream of the NOx catalyst 35. Detection signals from these sensors are input to an electronic control unit (ECU) 100.

The DPF 30 is a filter configured to collect particulate matter (PM) contained in the exhaust gas (EG). As is well known, the DPF 30 comprises, for example, a honeycomb member composed of metal or ceramics. A recovery process needs to be carried out on the DPF 30 when a predetermined amount of PM is accumulated. Specifically, unburned fuel is fed into exhaust gas by post injection or the like and combusted in the DPF 30. Thus, the collected PM is combusted to recover the filter function. The temperature of the DPF 30 for the recovery process is for example, between 600° C. and 700° C. A technique for determining whether or not a predetermined amount of PM has been accumulated is well known and will thus not be described. Furthermore, the DPF 30 may be configured to carry an oxidation catalyst comprising rare metal.

The urea aqueous solution addition valve 70 is fed with urea aqueous solution from a tank 75 and operates to add an amount of urea aqueous solution corresponding to a control signal from the ECU 100.

The NOx catalyst 35 uses, as a reducing agent, ammonia generated by hydrolyzing a urea aqueous solution added via the urea addition valve 70 to selectively reduce NOx contained in the exhaust gas EG to nitrogen gas and water. Specifically, the urea aqueous solution added into the exhaust gas EG is hydrolyzed by heat from the exhaust gas EG, into ammonia, which serves as a reducing agent. The ammonia is adsorbed and held on the NOx catalyst 35. The ammonia adsorbed and held on the NOx catalyst 35 reacts with NOx and is thus reduced to water and harmless nitrogen. When the amount of ammonia adsorbed on the NOx catalyst 35 exceeds a saturated adsorption amount, ammonia slip may occur. When the amount of ammonia adsorbed on the NOx catalyst 35 is excessively small, NOx may fail to be sufficiently purified. In this case, instead of the urea aqueous solution, ammonia may be directly supplied. Moreover, when a recovery process is executed on the DPF 30, the high-temperature exhaust gas also increases the bed temperature of the NOx catalyst 35. For example, an increase in the temperature of the DPF 30 up to about 700° C. also increases the temperature of the NOx catalyst 35 up to about 600 and several tens of degrees. When the temperature of the NOx catalyst 35 becomes so high as described above, the purification capability and ammonia adsorption capability of NOx are reduced or lost as described below.

The NOx catalyst 35 has a well-known structure. For example, the NOx catalyst may be composed of zeolite containing Si, O, and Al as main components, as well as Fe ions. Alternatively, the NOx catalyst may comprise a base material composed of aluminum alumina oxide and a vanadium catalyst ($V_2O_5$) carried on the surface thereof. The NOx catalyst 35 is not particularly limited to these examples.

The ECU 100 comprises hardware including a CPU (Central Processing Unit), backup memories such as a ROM (Read Only Memory), a RAM (Random Access Memory), and an EEPROM (Electronically Erasable and Programmable Read Only Memory), an input interface circuit including an A/D converter and a buffer, and an output interface circuit including a driving circuit, as well as required software. The ECU 100 not only controls the internal combustion engine 10 but also, based on signals from the NOx sensors 90A and 90B and the exhaust temperature sensors 95A and 95B, controls the amount of urea aqueous solution added via the urea aqueous solution addition valve 70 and controllably corrects the amount of urea aqueous solution as described below.

Figure 2:
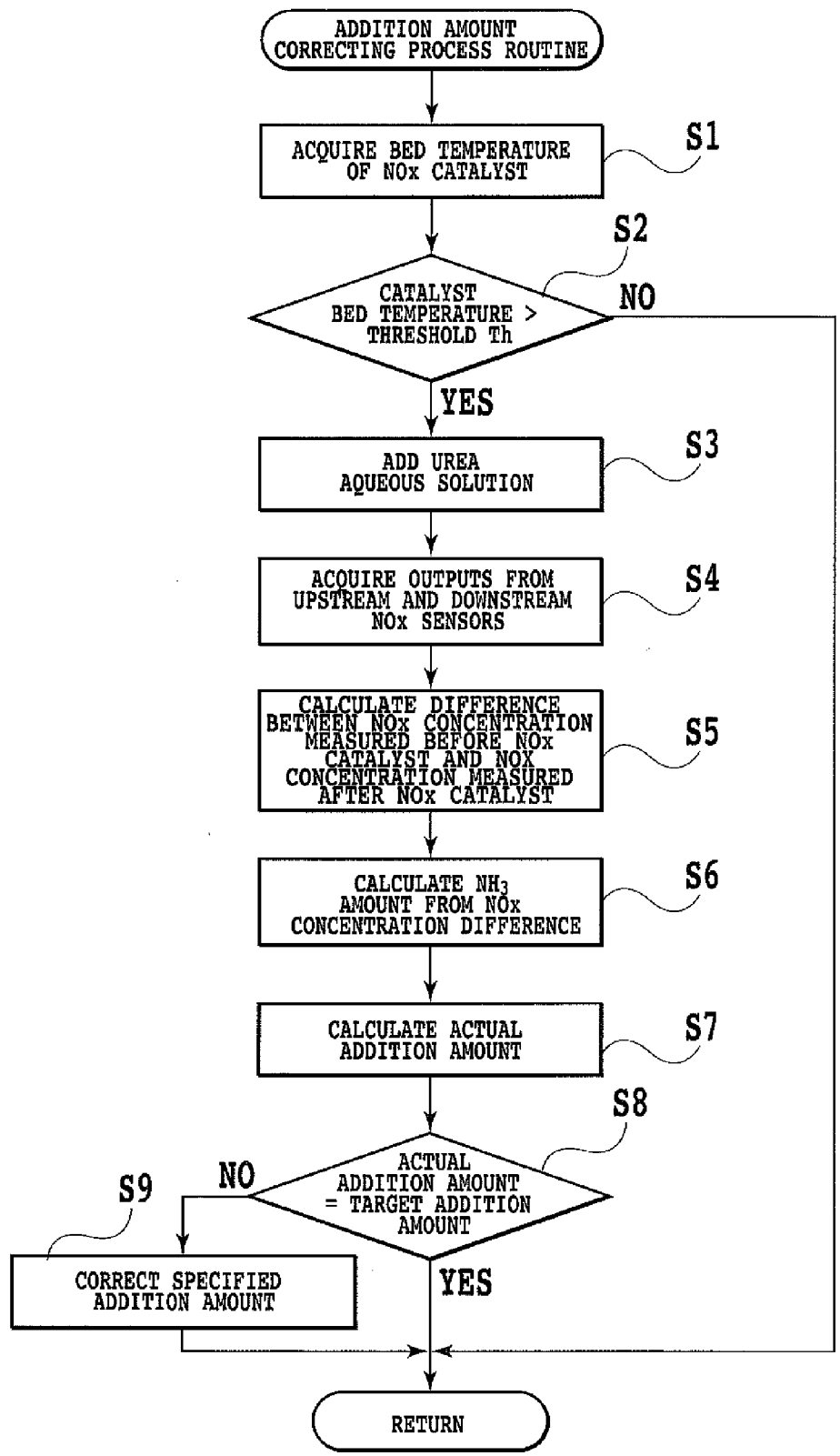
FIG. 2 is a flowchart showing an example of processing executed by an ECU.

Now, an example of a urea aqueous solution addition amount correcting process executed by the ECU 100 will be described with reference to the flowchart shown in FIG. 2. The processing routine shown in FIG. 2 is executed when the recovery process is carried out on the DPF 30.

First, the bed temperature of the NOx catalyst 35 is acquired (step S1). The bed temperature of the NOx catalyst 35 can be estimated from detected temperatures from the exhaust temperature sensors 95A and 95B. Alternatively, the bed temperature of the NOx catalyst 35 can directly be measured. Then, the ECU 100 determines whether or not the bed temperature of the NOx catalyst 35 exceeds a predetermined threshold Th (step S2).

Figure 3:
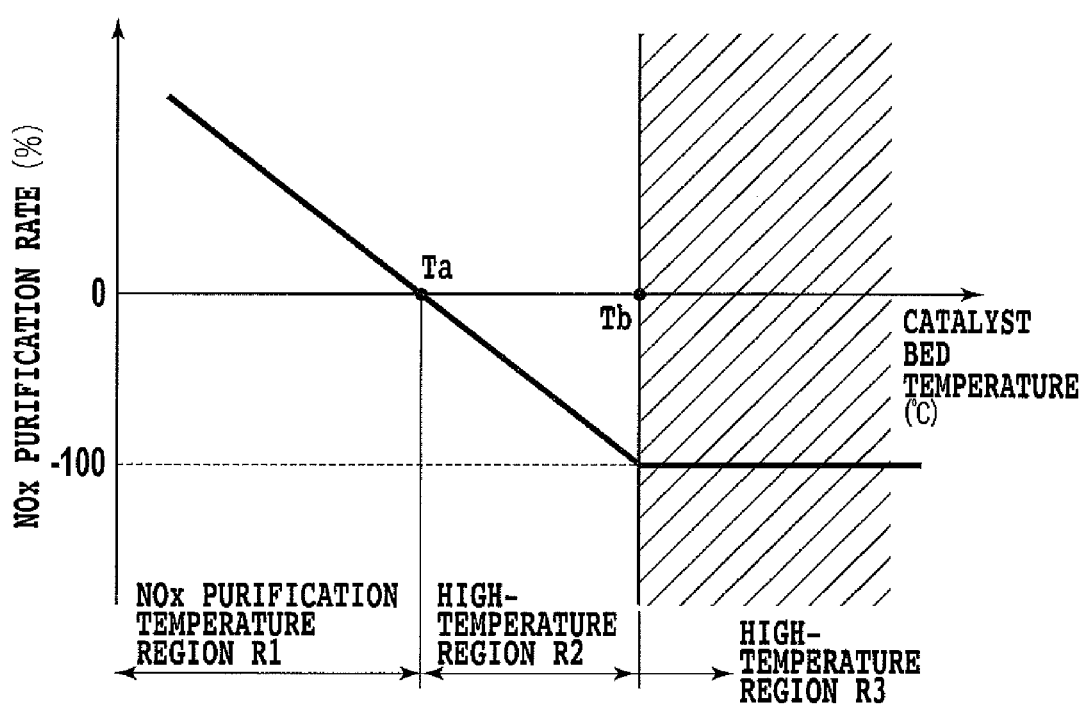
FIG. 3 is a timing chart showing an example of temperature characteristics of an NOx catalyst.

FIG. 3 shows the relationship between the bed temperature of the NOx catalyst 35 and the NOx purification rate.

The amount of NOx flowing into the NOx catalyst 35 is defined as Nin. The following amount of NOx is defined as Nout: the amount of NOx flowing out from the NOx catalyst 35 when a sufficient amount of urea aqueous solution is added which is required to purify all of the NOx amount Nin. Then, the NOx purification rate C of the NOx catalyst 35 is defined by:

$$C = \frac{Nin - Nout}{Nin} \times 100 \, [\%] \qquad \text{[Expression 1]}$$

As shown in FIG. 3, in an NOx purification temperature region (for example, a temperature region of lower than about 400° C.) R1 in which the NOx purification rate C is larger than 0%, the NOx catalyst 35 purifies and converts much of inflow NOx into nitrogen gas $N_2$ and water $H_2O$. A relatively lower temperature region of the NOx purification temperature region R1, most of the ammonia generated by hydrolysis of a urea aqueous solution is consumed for purification of NOx. The remaining ammonia is adsorbed on the NOx catalyst 35. Then, an increase in the bed temperature of the NOx catalyst 35 correspondingly degrades the purification capability of the NOx catalyst, while enhancing the oxidation capability thereof. This increases the rate at which the ammonia is converted into NOx.

At a temperature Ta at which the NOx purification rate C is 0% as shown in FIG. 3, half of the ammonia is consumed for NOx purification, with the remaining half oxidized and converted into NOx. In a high-temperature region R2 from a temperature Ta to a temperature Tb, an increase in the bed temperature of the NOx catalyst 35 from the temperature Ta correspondingly reduces the amount of ammonia used for NOx purification, while increasing the rate at which the ammonia is converted into NOx. At the temperature Tb, almost 100% of the ammonia is converted into NOx. In a temperature region R3 exceeding the temperature Ta, 100% of the ammonia is theoretically converted into NOx. Thus, the NOx purification rate is −100%.

In the present embodiment, the threshold Th in step S2 is set to a value in the high temperature region R2 or R3, in which the amount of ammonia converted into NOx increases relatively, while the NOx purification rate C decreases relatively. Additionally, the upper limit of the threshold Th is determined by an increase in the temperature of the NOx catalyst 35 resulting from the recovery process carried out on the DPF 30.

In step S2, if the bed temperature of the NOx catalyst 35 has not exceeded the threshold Th, the process is terminated, but during the recovery process for the DPF 30, an addition amount correcting process routine is repeated. In step S2, if the bed temperature of the NOx catalyst 35 has exceeded the threshold Th, a predetermined amount of urea aqueous solution is added via the urea aqueous solution addition valve 70 (step S3). In this case, before the recovery process for the DPF 30, the addition of a urea aqueous solution is temporarily stopped, and a urea aqueous solution is re-added during step S3. Alternatively, for example, a urea aqueous solution may be continuously added regardless of the recovery process for the DPF 30. Furthermore, if a urea aqueous solution is continuously added, the addition amount may be fixed or increased when the threshold Th is exceeded.

Then, outputs from the NOx sensors 90A and 90B, provided upstream and downstream of the NOx catalyst 35, respectively, are acquired (step S4). Then, the outputs from the NOx sensors 90A and 90B are used to determine the difference between NOx concentration measured before the NOx catalyst 35 and the NOx concentration measured after the NOx catalyst 35 (S5).

Figure 4:
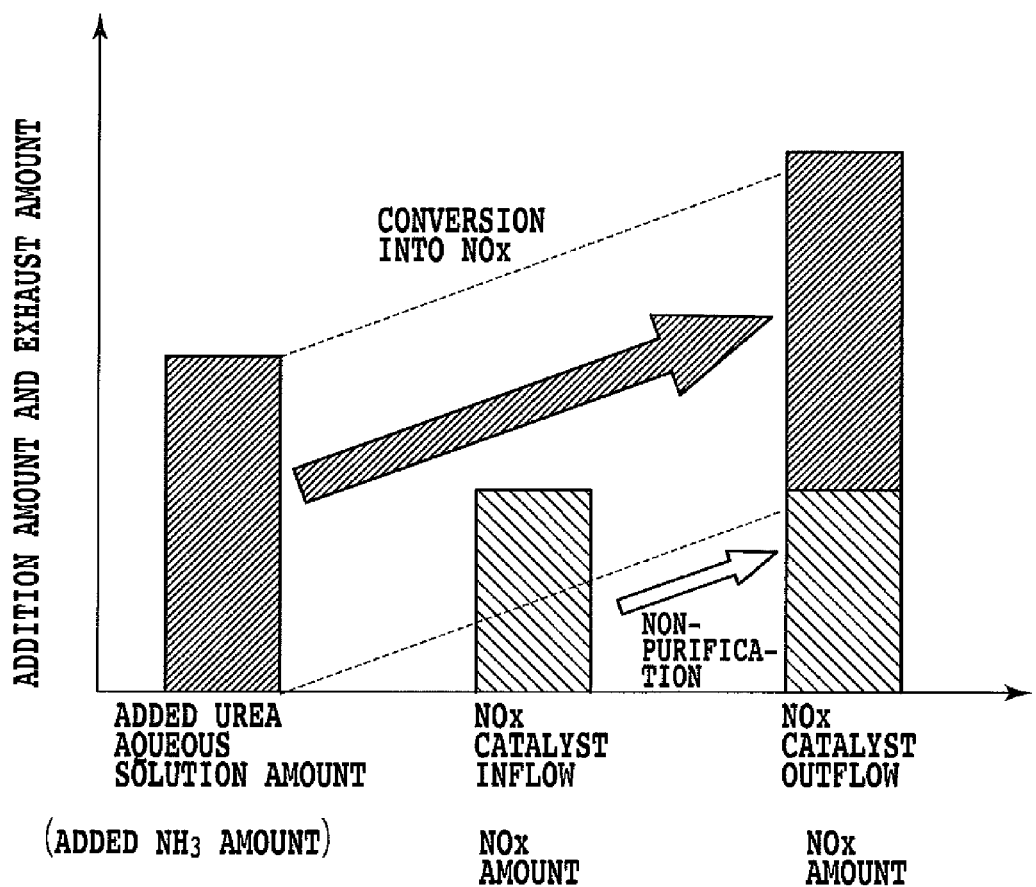
FIG. 4 is a diagram showing the relationship between the amounts of NOx and urea aqueous solution flowing into and out of the NOx catalyst.

For example, if the NO purification rate X of the NOx catalyst 35 is −100%, that is, if the bed temperature is in the high-temperature region R3, then for example, as shown in FIG. 4, all of the urea aqueous solution added to the NOx catalyst 35 (added ammonia amount) is converted into NOx, which then flows out from the NOx catalyst 35. Moreover, all of the NOx having flowed into the NOx catalyst 35 flows out from the NOx catalyst 35 without being purified. Hence, when the NO purification rate C of the NOx catalyst 35 is −100%, the amount of NOx flowing out from the NOx catalyst 35 is the sum of the amount of NOx resulting from the conversion of the added ammonia and the amount of NOx having flowed into the NOx catalyst 35.

The upstream NOx sensor 90A detects the NOx concentration corresponding to the amount of NOx flowing into the NOx catalyst 35. The downstream NOx sensor 90B detects the NOx concentration corresponding to the total NOx amount. Thus, the difference between NOx concentration measured before the NOx catalyst 35 and the NOx concentration measured after the NOx catalyst 35 can be determined based on the difference between the NOx concentration obtained from the upstream NOx sensor 90A and the NOx concentration obtained from the upstream NOx sensor 90B.

Figure 5A:
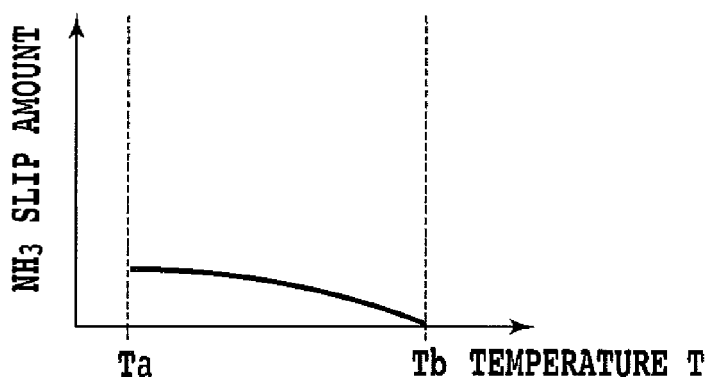
FIG. 5A is a graph showing the relationship between the bed temperature of the NOx catalyst and the amount of ammonia slip.
Figure 5B:
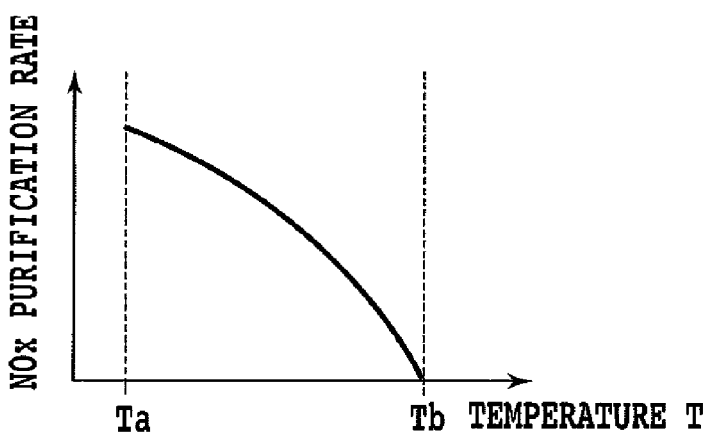
FIG. 5B is a graph showing the relationship between the bed temperature of the NOx catalyst and an NOx purification rate.
Figure 5C:
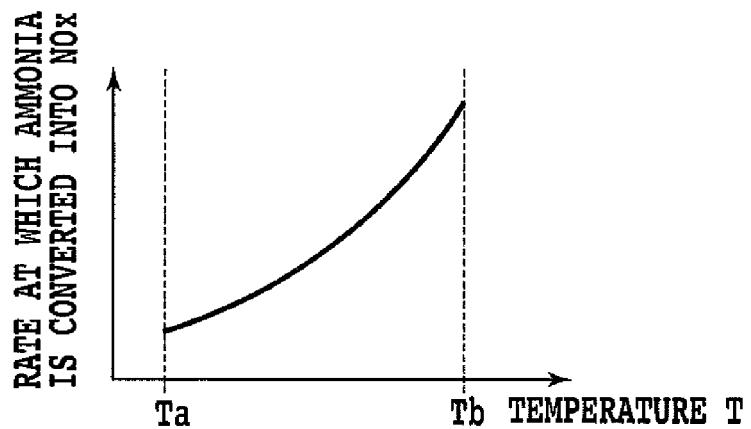
FIG. 5C is a graph showing the relationship between the bed temperature of the NOx catalyst and the rate at which urea aqueous solution is converted into NOx.

Furthermore, for example, if the bed temperature of the NOx catalyst 25 is in the high-temperature region R2, not all of the added ammonia is converted into NOx. In the high-temperature region R2, addition of an excessive amount of urea aqueous solution may cause slippage of an amount of ammonia having failed to be used for NOx purification or converted into NOx. As shown in FIG. 5A, the slip amount decreases with increasing bed temperature. Additionally, as shown in FIG. 5B, the NOx purification rate of the NOx catalyst 35 decreases with increasing bed temperature. Moreover, as shown in FIG. 5C, the rate at which ammonia is converted into NOx increases consistently with the bed temperature. Thus, if for example, the threshold Th is set to a value in the high-temperature region R2, the difference between NOx concentration measured before the NOx catalyst 35 and the NOx concentration measured after the NOx catalyst 35 can be corrected to a more accurate value using at least one of the relationships shown in FIGS. 5A to 5C. In addition, the present embodiment can be appropriately modified such that even for the high-temperature region R3, a more accurate NOx concentration difference can be obtained instead of the simple difference between the outputs from the NOx sensors 90A and 90B.

Then, the amount of ammonia added is calculated from the NOx concentration difference determined in step S5 (step S6). The actual addition amount of urea aqueous solution is calculated from the calculated ammonia amount (step S7). Then, the calculated actual addition amount of urea aqueous solution is compared with the target addition amount of urea aqueous solution. The process thus determines whether or not the amounts are equal, that is, whether or not there is a deviation of at least a predetermined amount (step S8). If the deviation between the actual addition amount of urea aqueous solution and the target addition amount of urea aqueous solution is equal to or larger than a predetermined amount, the addition amount of urea aqueous solution specified for the urea aqueous solution addition valve 70 is corrected such that the actual addition amount of urea aqueous solution is equal to the target addition amount (step S9). Thus, the actual addition amount of urea aqueous solution is corrected to an appropriate value. Hence, an appropriate amount of urea aqueous solution is added to the NOx catalyst. This enables a decrease in NOx purification rate and possible ammonia slip to be inhibited.

Figure 6:
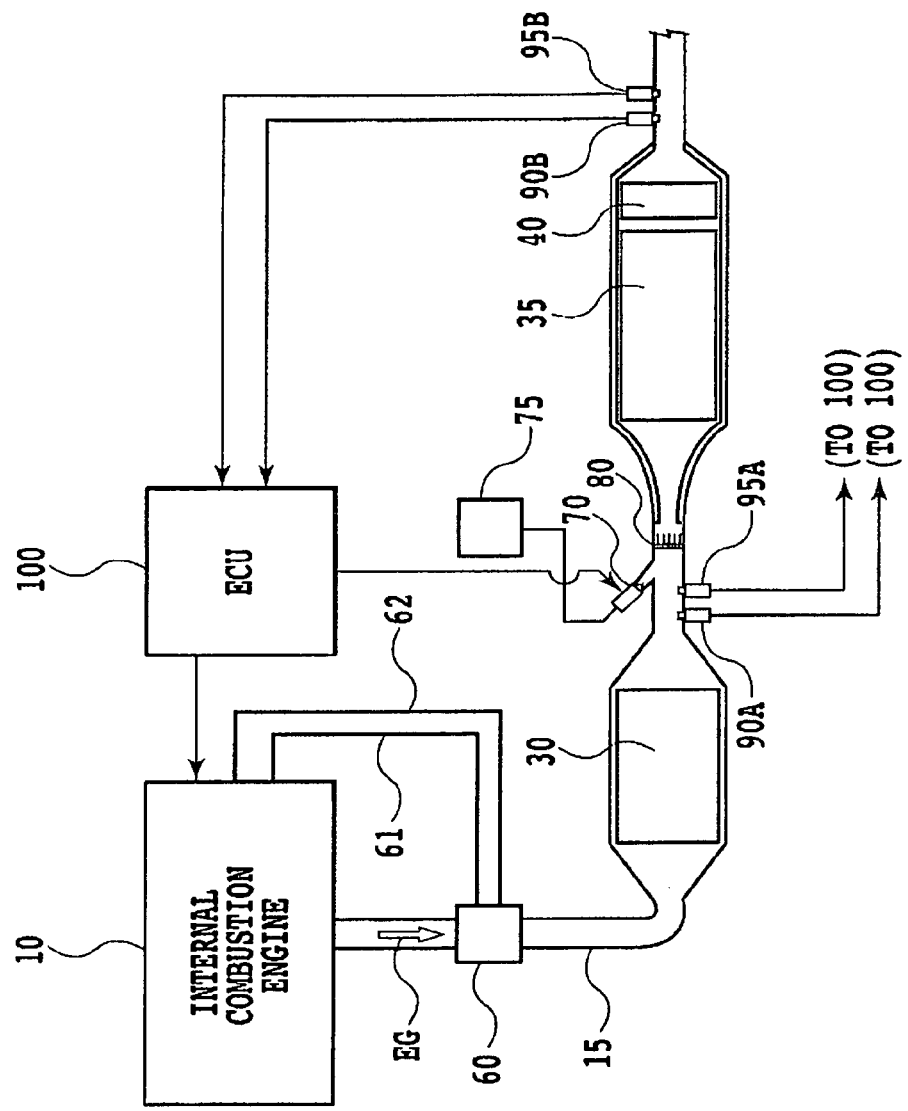
FIG. 6 is a schematic diagram showing the configuration of an exhaust purification apparatus for an internal combustion engine according to another embodiment of the present invention.

FIG. 6 is a diagram showing the configuration of an exhaust purification apparatus for an internal combustion engine according to another embodiment of the present invention. In FIG. 6, the same components as those in FIG. 6 are denoted by the same reference numerals.

The exhaust purification apparatus shown in FIG. 6 comprises a burner 60 provided upstream of a DPF 30 and serving as heating means, and an oxidation catalyst 40 provided downstream of the NOx catalyst. An NOx sensor 90B and an exhaust temperature sensor 95B are provided at the outlet of the oxidation catalyst 40.

An air supply path 61 through which air is supplied and a fuel supply path 62 through which fuel is supplied are connected to the burner 60; the air supply path 61 and the fuel supply path 62 are arranged in this order from the internal combustion engine 10 side. Fuel supplied through the fuel supply path 62 is combusted, and the resultant combustion gas is fed to an exhaust passage 15. Furthermore, the amount of air from the air supply path 61 and the amount of fuel from the fuel supply path 62 are controlled to control the air-fuel ratio of the combustion gas. The burner 60 is used to increase the bed temperatures of a DPF 30 and an NOx catalyst 35. That is, regardless of the recovery process for the DPF 30, the burner 60 can be used to increase the temperature of the NOx catalyst 35 into the above-described high-temperature regions R2 and R3.

The oxidation catalyst 40 is provided to oxidize ammonia having slipped through the NOx catalyst 35, into NOx. That is, provision of the oxidation catalyst 40 promotes the conversion of a urea aqueous solution (ammonia) added to the NOx catalyst 35 into NOx. Thus, the above-described NOx concentration difference can be accurately determined. As a result, the addition amount of urea aqueous solution can be controllably corrected more precisely.

In the above-described embodiment, by way of example, the recovery process for the DPF 30 or the burner 60 is used to set the temperature of the NOx catalyst 35 to a value in a predetermined high-temperature region. However, the present invention is not limited to these aspects. For example, during rapid acceleration or what is called towing in which a high load is applied to the internal combustion engine 10, the temperature of the exhaust gas increases to allow the temperature of the NOx catalyst 35 to reach the predetermined high-temperature region. Even in this case, the addition amount correction control as described above is possible.

Instead of the burner, a heater configured to heat the exhaust gas or NOx catalyst can be used as heating means.

In the above-described embodiments, the DPF 30 is located upstream of the NOx catalyst. However, the present invention is also applicable to the case in which the DPF 30 is provided downstream of the NOx catalyst 35. The present invention is also applicable to the case in which the DPF 30 is not used.

REFERENCE SIGNS LIST

10 . . . Internal combustion engine
15 . . . exhaust passage
30 . . . DPF (filter)
35 . . . NOx catalyst
60 . . . Burner
70 . . . Urea aqueous solution addition valve
100 . . . ECU
90A, 90B . . . NOx sensor
95A, 95B . . . . Exhaust temperature sensor

The invention claimed is:

1. An exhaust purification apparatus for an internal combustion engine comprising:
    an NOx catalyst provided in an exhaust system of the internal combustion engine to selectively reduce NOx;
    a reducing agent inlet provided upstream of the NOx catalyst, through which a urea aqueous solution or ammonia is supplied to the NOx catalyst as a reducing agent;
    a first NOx sensor provided upstream of the reducing agent inlet and a second NOx sensor provided at an outlet of the NOx catalyst, each of the NOx sensors reacting both to NOx and to ammonia; and
    a controller configured to:
        determine whether a bed temperature of the NOx catalyst has exceeded a threshold set in a predetermined temperature region;
        calculate an actual amount of reducing agent added through the reducing agent inlet using outputs from the first and second NOx sensors when the bed temperature of the NOx catalyst has exceeded the threshold; and
        correct the actual amount of reducing agent so that the actual amount of reducing agent follows a target addition amount if a deviation between the actual amount of reducing agent and the target addition amount is equal to or larger than a predetermined amount,
    wherein the predetermined temperature region is a temperature region that is equal to or higher than such a temperature that half of the reducing agent added is converted into NOx in a process where a rate at which the reducing agent is converted into NOx increases as the bed temperature of the NOx catalyst increases.

2. The exhaust purification apparatus for the internal combustion engine according to claim 1, further comprising a filter provided upstream of the NOx catalyst to collect particulate matter contained in exhaust gas,
    wherein the bed temperature of the NOx catalyst is increased into the predetermined temperature region by a recovery process of oxidizing the particulate matter in order to recover a collection capability of the filter.

3. The exhaust purification apparatus for the internal combustion engine according to claim 1, further comprising a burner or a heater that increases the temperature of the NOx catalyst into the predetermined temperature region.

4. The exhaust purification apparatus for the internal combustion engine according to claim 1, wherein the controller uses the outputs from the first and second NOx sensors to determine the difference between the NOx concentration measured before the NOx catalyst and the NOx concentration measured after the NOx catalyst, and then uses the NOx concentration difference to calculate the actual amount of reducing agent added through the reducing agent inlet.

5. The exhaust purification apparatus for the internal combustion engine according to claim 4, wherein the controller corrects the actual addition amount of reducing agent using, in addition to the outputs from the first and second NOx sensors, at least one of a predetermined relationship between a bed temperature of the NOx catalyst and an ammonia slip amount, a predetermined relationship between the bed temperature of the NOx catalyst and a NOx purification rate, and a predetermined relationship between the bed temperature of the NOx catalyst and a rate at which ammonia is converted into NOx.

6. The exhaust purification apparatus for the internal combustion engine according to claim 1, further comprising an oxidation catalyst provided downstream of the NOx catalyst to oxidize ammonia slipping through the NOx catalyst, into NOx, and
   wherein the second NOx sensor is provided downstream of the oxidation catalyst.

7. The exhaust purification apparatus for the internal combustion engine according to claim 1, wherein the controller is further configured to not perform the correction when the bed temperature has not exceeded the threshold.

\* \* \* \* \*